(12) United States Patent
Chinen (10) Patent No.: US 10,951,151 B2
(45) Date of Patent: Mar. 16, 2021

(54) DRIVE DEVICE

(71) Applicant: AISIN AW CO., LTD., Anjo (JP)

(72) Inventor: Shintaro Chinen, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/489,883

(22) PCT Filed: Mar. 30, 2018

(86) PCT No.: PCT/JP2018/013750
§ 371 (c)(1),
(2) Date: Aug. 29, 2019

(87) PCT Pub. No.: WO2018/181945
PCT Pub. Date: Oct. 4, 2018

(65) Prior Publication Data
US 2020/0014323 A1  Jan. 9, 2020

(30) Foreign Application Priority Data

Mar. 30, 2017  (JP) .............................. JP2017-067454

(51) Int. Cl.
*H02P 1/32* (2006.01)
*H02P 25/22* (2006.01)
*H02P 27/06* (2006.01)

(52) U.S. Cl.
CPC .............. *H02P 25/22* (2013.01); *H02P 27/06* (2013.01)

(58) Field of Classification Search
CPC ................................ H02P 27/06; H02K 11/33
See application file for complete search history.

(56) References Cited

U.S. PATENT DOCUMENTS

| 2017/0149292 A1* | 5/2017 | Bae .......................... H02J 5/005 |
| 2017/0366115 A1 | 12/2017 | Akutsu et al. |
| 2018/0208236 A1* | 7/2018 | Asao .................... H02P 29/0241 |

FOREIGN PATENT DOCUMENTS

| JP | H9-182394 A | 7/1997 |
| JP | H9-331694 A | 12/1997 |
| JP | 2005-86879 A | 3/2005 |
| JP | 2017-17888 A | 1/2017 |

OTHER PUBLICATIONS

Jun. 19, 2018 International Search Report issued in International Patent Application No. PCT/JP2018/013750.

* cited by examiner

*Primary Examiner* — Karen Masih
(74) *Attorney, Agent, or Firm* — Oliff PLC (57) ABSTRACT

A drive device that includes a rotating-field rotary electric machine; and an inverter that drives the rotary electric machine, wherein: the rotary electric machine includes a stator core, and a coil wound on the stator core; the coil includes a first coil and a second coil electrically insulated from each other; and the inverter includes a first inverter circuit that supplies AC power to the first coil, and a second inverter circuit that supplies AC power to the second coil.

4 Claims, 7 Drawing Sheets

DRIVE DEVICE

BACKGROUND

The present disclosure relates to a drive device including a rotating-field rotary electric machine and an inverter that drives the rotary electric machine.

An example of the drive device described above is disclosed in Japanese Patent Application Publication No. 2017-17888. As illustrated in FIG. 1 of Japanese Patent Application Publication No. 2017-17888, a drive device of Japanese Patent Application Publication No. 2017-17888 includes a motor generator (11) and an inverter (12) that drives the motor generator (11). The inverter (12) includes an inverter circuit having a plurality of switching elements (Sup to Swn). When the switching elements are individually subjected to switching control such that the inverter circuit supplies AC power to a stator winding of each phase, the motor generator (11) is driven. Note that in BACKGROUND, reference numerals in parentheses denote elements in Japanese Patent Application Publication No. 2017-17888.

The drive device described above needs to use an inverter capable of supplying AC power of a magnitude corresponding to a required output of a rotary electric machine to the rotary electric machine (specifically, a coil wound on a stator core). The magnitude of AC power that can be supplied to the rotary electric machine from the inverter is restricted by the capacity (power capacity) of the inverter circuit determined in accordance with the properties of the switching elements (such as rated current and withstand voltage). Thus, when the inverter circuit of the inverter has a capacity corresponding to the required output of the rotary electric machine, it is possible to supply AC power of a magnitude corresponding to the required output of the rotary electric machine from the inverter to the rotary electric machine. However, there is a limit in increasing the capacity of the inverter circuit. Therefore, depending on the magnitude of the required output of the rotary electric machine, it may be difficult to increase the capacity of the inverter circuit to a capacity corresponding to the required output of the rotary electric machine. However, Japanese Patent Application Publication No. 2017-17888 does not discuss this issue.

SUMMARY

An exemplary aspect of the disclosure provides a drive device in which the magnitude of AC power that can be supplied from an inverter to the rotary electric machine is increased while minimizing the capacity required for an inverter circuit.

In view of the above, there is provided a drive device including: a rotating-field rotary electric machine; and an inverter that drives the rotary electric machine, wherein: the rotary electric machine includes a stator core, and a coil wound on the stator core; the coil includes a first coil and a second coil electrically insulated from each other; and the inverter includes a first inverter circuit that supplies AC power to the first coil, and a second inverter circuit that supplies AC power to the second coil.

According to the above characteristic configuration, the rotary electric machine can be driven by both the AC power supplied from the first inverter circuit to the first coil and the AC power supplied from the second inverter circuit to the second coil. That is, the first inverter circuit and the second inverter circuit can together supply AC power to the rotary electric machine. Accordingly, it is possible to increase the capacity of the entire inverter, that is, increase the magnitude of AC power that can be supplied from the inverter to the rotary electric machine, while minimizing the required capacity of each of the first inverter circuit and the second inverter circuit.

Other features and advantages of the drive device will become apparent from the following description of the embodiments with reference to the accompanying drawings.

DETAILED DESCRIPTION OF EMBODIMENTS

First Embodiment

A drive device according to a first embodiment will be described with reference to FIGS. 1 to 7. In the following description, an "axial direction L", a "radial direction R", and a "circumferential direction C" are defined with respect to a center axis X (center axis of a cylindrical inner peripheral surface or outer peripheral surface) of a stator core 22 serving as a core of a stator 21 (rotary electric machine stator). The center axis X is a virtual axis, and a rotor 25 of the rotary electric machine 20 rotates about the center axis X. The term "rotary electric machine" as used herein refers to any of a motor (electric motor), a generator (electric generator), and a motor generator that serve as both a motor and a generator as necessary. The terms related to the size, arrangement direction, arrangement position, and so on as used herein may allow differences due to errors (acceptable manufacturing errors).

Figure 1:
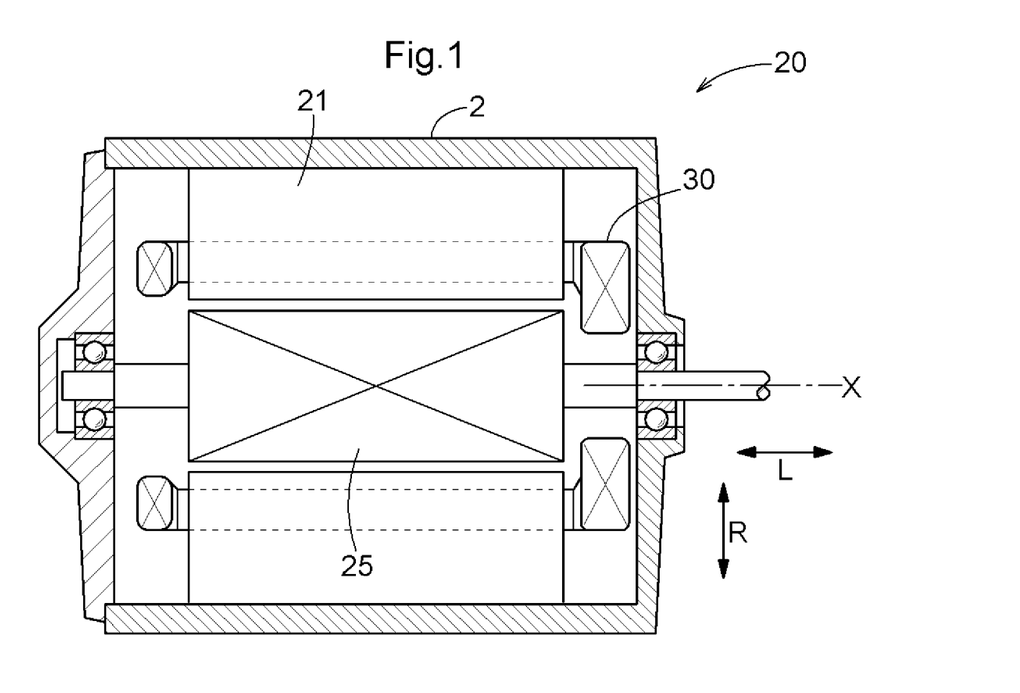
FIG. 1 illustrates an example of a rotary electric machine.
Figure 3:
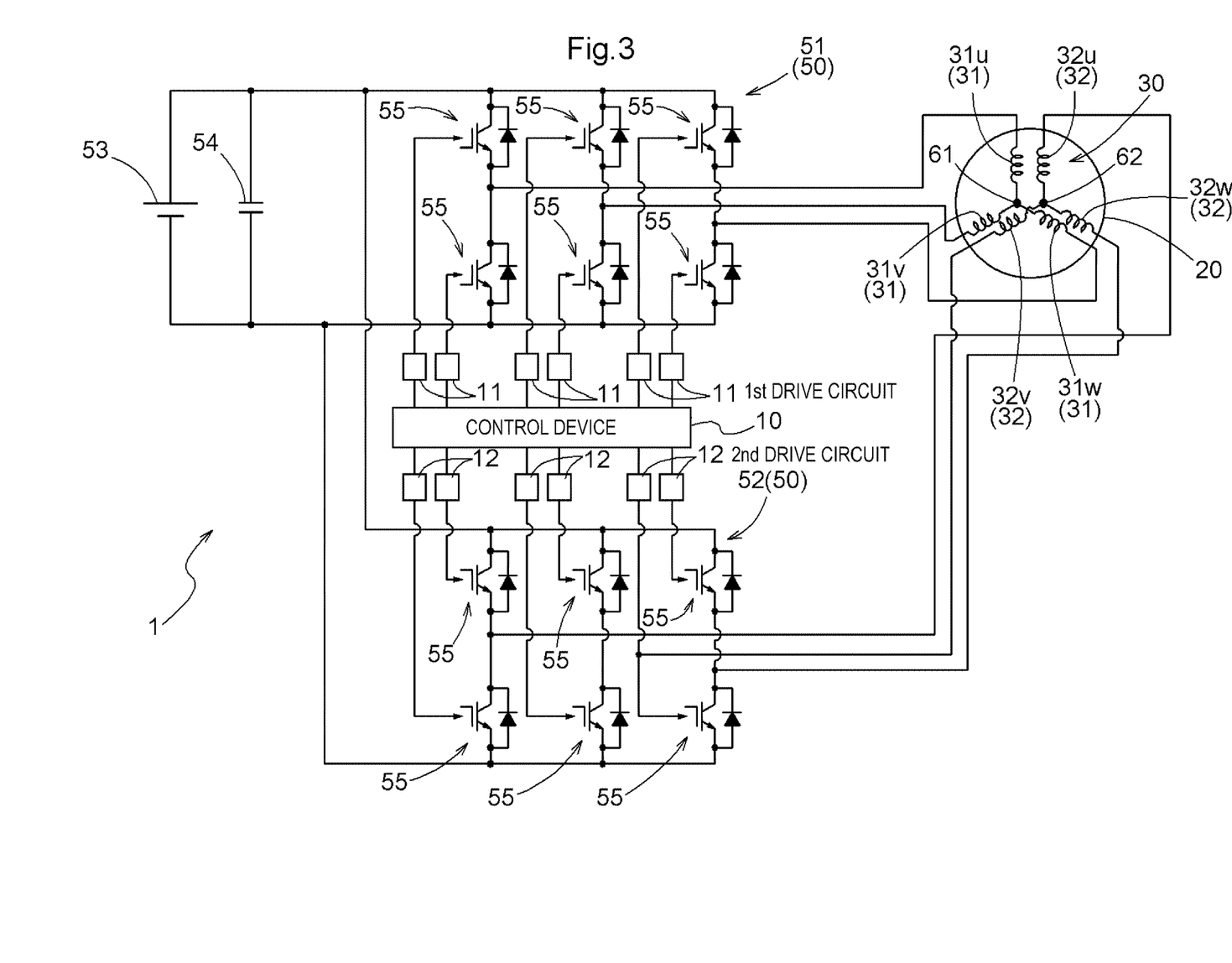
FIG. 3 is a schematic configuration diagram illustrating a drive device according to the first embodiment.

As illustrated in FIG. 3, the drive device 1 includes the rotary electric machine 20 and an inverter 50 that drives the rotary electric machine 20. As illustrated in FIG. 1, the rotary electric machine 20 includes the rotor 25 and the stator 21. In the example of FIG. 1, the rotary electric machine 20 is accommodated in a case 2. The stator 21 (stator core 22) is fixed to the inner surface of the case 2. The rotor 25 is rotatably supported on the case 2. The rotary electric machine 20 is a rotating-field rotary electric machine (synchronous rotary electric machine in the present embodiment). Due to a rotating magnetic field generated by the stator 21 serving as an armature, the rotor 25 serving as a field including a permanent magnet or an electromagnet rotates. In the present embodiment, the rotary electric machine 20 is a radial gap type rotary electric machine. Specifically, the rotary electric machine 20 is an inner rotor type rotary electric machine in which the rotor 25 is disposed on an inner side with respect to the stator 21 (stator core 22) in the radial direction R so as to overlap the stator 21 (stator core 22) when viewed in the radial direction R.

Figure 2:
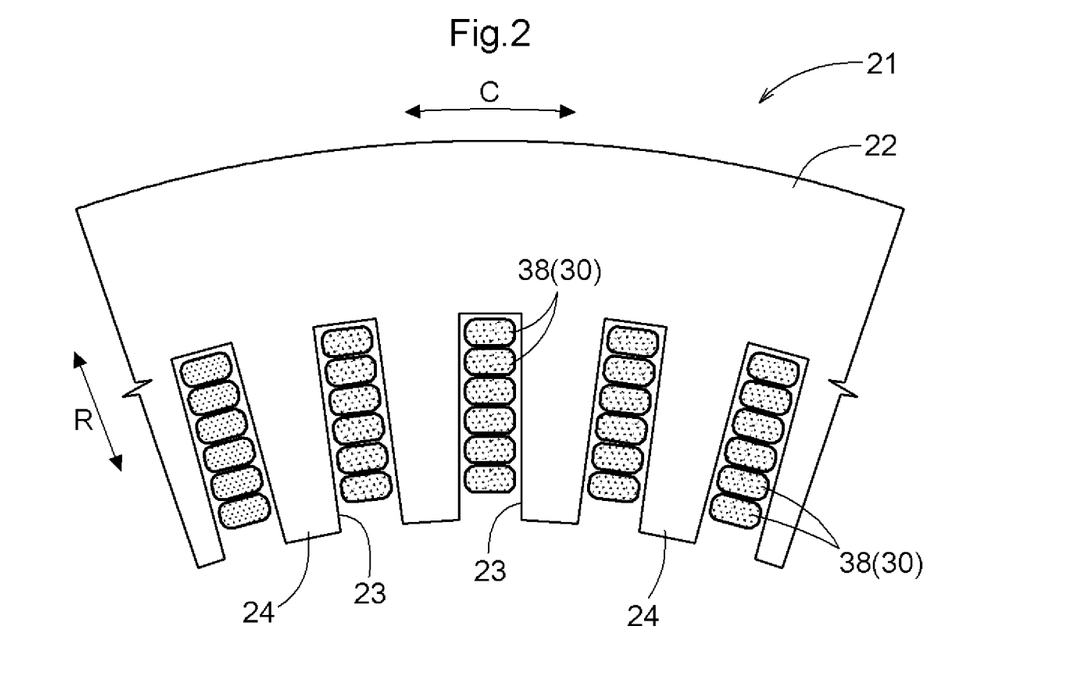
FIG. 2 is a cross-sectional view illustrating a part of a stator in a direction orthogonal to an axial direction according to a first embodiment.

As illustrated in FIG. 2, the stator 21 includes the stator core 22 having a plurality of slots 23 in the circumferential direction C, and a coil 30 wound on the stator core 22. That is, the rotary electric machine 20 includes the stator core 22, and the coil 30 wound on the stator core 22. The stator core 22 includes a plurality of slots 23 (forty-eight slots 23 in the present embodiment, see FIG. 6) arranged in a distributed manner in the circumferential direction C. The plurality of slots 23 are arranged at regular intervals in the circumferential direction C. Teeth 24 are formed between each two adjacent slots 23 in the circumferential direction C. Each slot 23 is formed to extend in the axial direction L and the radial direction R. In the present embodiment, each slot 23 is open on both sides in the axial direction L, and is open toward the rotor 25 in the radial direction R (toward the inner side in the radial direction R in this example).

Figure 7:
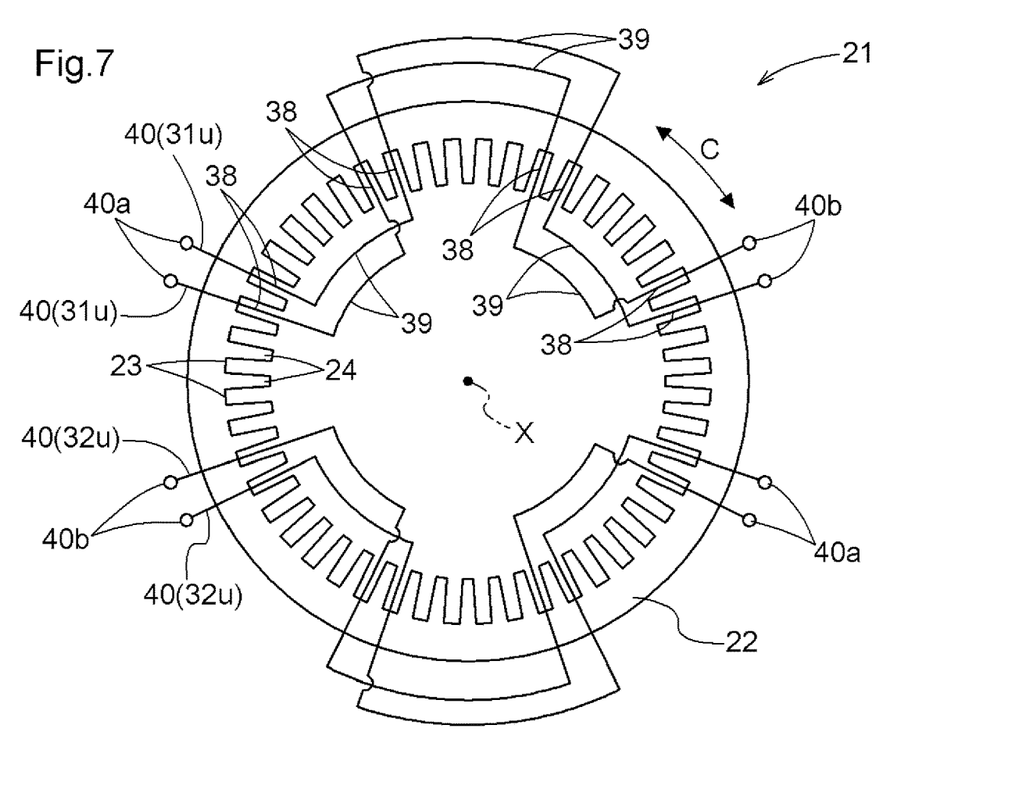
FIG. 7 illustrates wave-wound turns wound on a stator core according to the first embodiment.

As illustrated in FIG. 2, the coil 30 includes in-slot portions 38 disposed inside the slots 23. In the present embodiment, six in-slot portions 38 are disposed in each slot 23. The plurality of in-slot portions 38 (six in-slot portions 38 in this example) disposed in each slot 23 are aligned in the slot 23, to be specific, aligned in a line in the radial direction R. Further, as illustrated in FIG. 7, the coil 30 includes jumper portions 39 each connecting two in-slot portions 38 on the outer side of the slots 23. The jumper portions 39 are arranged on one side or the other side in the extending direction of the slots 23 (the axial direction L in this example) with respect to the stator core 22. In the present embodiment, the in-slot portions 38 are disposed to extend in the axial direction L inside the slots 23, and the jumper portions 39 are disposed on the outer side of the stator core 22 in the axial direction L. In FIG. 7, to facilitate understanding of how the coil 30 (wave-wound turns 40 described below) is wound on the stator core 22, the coil 30 (wave-wound turns 40) is exploded in the circumferential direction C in such a manner that the inner side in the radial direction R corresponds to the near side of FIG. 7, and is superposed on the stator core 22.

Figure 6:
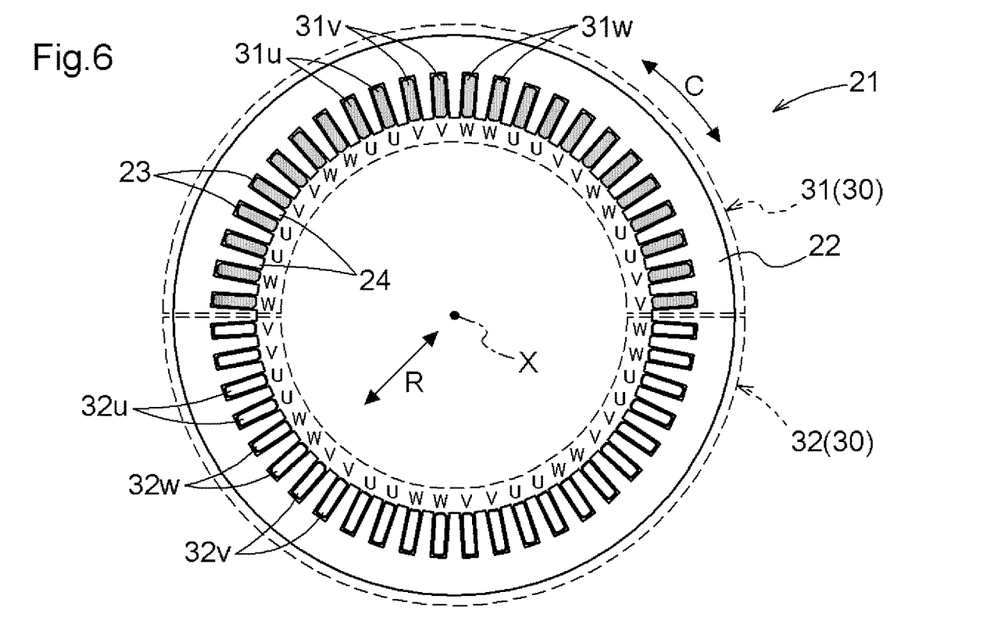
FIG. 6 illustrates the arrangement of a first coil portion and a second coil portion according to the first embodiment.

The coil 30 is a multi-phase coil, and is wound on the stator core 22 such that the slots 23 of each phase are sequentially and repeatedly arranged in the circumferential direction C. In the present embodiment, the coil 30 is a three-phase coil. As illustrated in FIG. 6, the coil 30 is wound on the stator core 22 such that the U-phase slots 23, the V-phase slots 23, and the W-phase slots 23 are sequentially and repeatedly arranged in the circumferential direction C. In the present embodiment, the coil 30 is wound on the stator core 22 such that the number of slots 23 in each pole and each phase is plural. Specifically, the coil 30 is wound on the stator core 22 such that the number of slots 23 in each pole and each phase is "2". That is, the coil 30 is wound on the stator core 22 such that the slots 23 of each phase are sequentially and repeatedly arranged in pairs in the circumferential direction C.

As illustrated in FIG. 3, the coil 30 includes a first coil portion 31 (first coil) and a second coil portion 32 (second coil). The first coil portion 31 and the second coil portion 32 are electrically insulated from each other. That is, an electric circuit for supplying AC power from the inverter 50 to the first coil portion 31 (an electric circuit including a power line connecting the first coil portion 31 to the inverter 50, and the first coil portion 31) and an electric circuit for supplying AC power from the inverter 50 to the second coil portion 32 (an electric circuit including a power line connecting the second coil portion 32 to the inverter 50, and the second coil portion 32) are formed independently of each other. The inverter 50 is configured to supply AC power to each of the first coil portion 31 and the second coil portion 32 independently of each other.

In the present embodiment, the coil 30 is a three-phase coil. Accordingly, as illustrated in FIG. 3, the first coil portion 31 includes three phase coil portions, namely, a first U-phase coil portion 31u, a first V-phase coil portion 31v, and a first W-phase coil portion 31w, and the second coil portion 32 includes three phase coil portions, namely, a second U-phase coil portion 32u, a second V-phase coil portion 32v, and a second W-phase coil portion 32w. Further, in the present embodiment, the three phase coil portions included in the first coil portion 31 are star-connected, and the three phase coil portions included in the second coil portion 32 are star-connected. That is, in the present embodiment, both the first coil portion 31 and the second coil portion 32 are star connections. Specifically, first ends of the first U-phase coil portion 31u, the first V-phase coil portion 31v, and the first W-phase coil portion 31w are connected to each other at a neutral point (first neutral point 61), and second ends of the first U-phase coil portion 31u, the first V-phase coil portion 31v, and the first W-phase coil portion 31w are connected to connection terminals of the respective terminals (power line terminals to which power lines are connected). Further, first ends of the second U-phase coil portion 32u, the second V-phase coil portion 32v, and the second W-phase coil portion 32w are connected to each other at a neutral point (second neutral point 62), and second ends of the second U-phase coil portion 32u, the second V-phase coil portion 32v, and the second W-phase coil portion 32w are connected to connection terminals of the respective terminals (power line terminals to which power lines are connected). The second neutral point 62 is formed independently of (that is, electrically insulated from) the first neutral point 61. The connection terminals of the second coil portion 32 are formed independently of (that is, electrically insulated from) the first coil portion 31.

As described above, each of the first coil portion 31 and the second coil portion 32 includes a plurality of phase coil portions (three phase coil portions in the present embodiment) through which alternating currents of different phases flow. Specifically, the first coil portion 31 includes three phase coil portions, namely, the first U-phase coil portion 31u, the first V-phase coil portion 31v, and the first W-phase coil portion 31w, through which alternating currents of different phases flow, and the second coil portion 32 includes three phase coil portions, namely, the second U-phase coil portion 32u, the second V-phase coil portion 32v, and the second W-phase coil portion 32w, through which alternating currents of different phases flow. The first U-phase coil portion 31u and the second U-phase coil portion 32u are controlled such that currents of the same phase (U-phase) flow therethrough; the first V-phase coil portion 31v and the second V-phase coil portion 32v are controlled such that currents of the same phase (V-phase) flow therethrough; and the first W-phase coil portion 31w and the second W-phase coil portion 32w are controlled such that currents of the same phase (W-phase) flow therethrough. A set of a phase coil portion of the first coil portion 31 and a phase coil portion of the second coil portion 32 that are controlled such that currents of the same phase flow therethrough is defined as an "in-phase coil set". Thus, in the present embodiment, the first U-phase coil portion 31u and the second U-phase coil portion 32u form an in-phase coil set; the first V-phase coil portion 31v and the second V-phase coil portion 32v form an in-phase coil set; and the first W-phase coil portion 31w and the second W-phase coil portion 32w form an in-phase coil set.

As illustrated in FIG. 3, the inverter 50 includes a first inverter circuit 51 that supplies AC power to the first coil portion 31, and a second inverter circuit 52 that supplies AC power to the second coil portion 32. Each of the first inverter circuit 51 and the second inverter circuit 52 is a circuit that converts power between DC power and multi-phase (three-phase in the present embodiment) AC power. The first inverter circuit 51 and the second inverter circuit 52 are connected in parallel to a DC power supply 53 (a battery, a capacitor, or the like). Thus, in the case where the rotary electric machine 20 serves as a motor, the first inverter circuit 51 converts DC power supplied from the DC power supply 53 into AC power, and supplies the AC power to the first coil portion 31. Further, the second inverter circuit 52 converts DC power supplied from the DC power supply 53 into AC power, and supplies the AC power to the second coil portion 32. Whereas, in the case where the rotary electric machine 20 serves as a generator, the first inverter circuit 51 converts AC power supplied from the first coil portion 31 into DC power, and supplies the DC power to the DC power supply 53. Further, the second inverter circuit 52 converts AC power supplied from the second coil portion 32 into DC power, and supplies the DC power to the DC power supply 53.

A smoothing capacitor 54 that smooths the voltage between the positive and negative electrodes is disposed between the DC power supply 53 and the first and second inverter circuits 51 and 52. In the example of FIG. 3, the first inverter circuit 51 and the second inverter circuit 52 share the smoothing capacitor 54. However, the first inverter circuit 51 and the second inverter circuit 52 may be provided with separate smoothing capacitors. Further, although not illustrated, a contactor that electrically disconnects between the DC power supply 53 and a circuit extending from the smoothing capacitor 54 to the rotary electric machine 20 is disposed between the DC power supply 53 and the smoothing capacitor 54.

Each of the first inverter circuit 51 and the second inverter circuit 52 includes a bridge circuit. As illustrated in FIG. 3, the bridge circuit includes the number of arms corresponding to the number of phases (the same number of arms as the number of phases in the present embodiment). More specifically, the bridge circuit includes arms, one for each of the U-phase, V-phase, and W-phase. The three arms are connected in parallel to form the bridge circuit. Each arm includes a serial circuit of two switching elements 55. A neutral point (connection point of two switching elements 55) of each of the three arms of the first inverter circuit 51 is connected to a corresponding one of the three power line terminals of the first coil portion 31. Further, a neutral point (connection point of two switching elements 55) of each of the three arms of the second inverter circuit 52 is connected to a corresponding one of the three power line terminals of the second coil portion 32. A freewheel diode is connected in parallel to each of the switching elements 55. In FIG. 3, the switching element 55 is an insulated-gate bipolar transistor (IGBT). However, the switching element 55 may be a metal-oxide-semiconductor field-effect transistor (MOS-FET) or the like.

As illustrated in FIG. 3, the drive device 1 includes a control device 10 that generates a switching control signal (gate drive signal in the present embodiment) for controlling switching of the inverter 50. The control device 10 includes, as a core member, a logical circuit such as a microcomputer. The control device 10 has various functions, each of which is implemented through cooperation between hardware such as a microcomputer and software (program). The control device 10 may be a set of multiple pieces of hardware (multiple separate pieces of hardware) that can communicate with each other.

The drive device 1 further includes a first drive circuit 11 that drives the first inverter circuit 51 based on a switching control signal input from the control device 10, and a second drive circuit 12 that drives the second inverter circuit 52 based on a switching control signal input from the control device 10. Control terminals (gate terminals in the present embodiment) of the switching elements 55 included in the first inverter circuit 51 are connected to the control device 10 via the first drive circuit 11. Thus, the plurality of switching elements 55 included in the first inverter circuit 51 are individually subjected to switching control by the control device 10. Control terminals (gate terminals in the present embodiment) of the switching elements 55 included in the second inverter circuit 52 are connected to the control device 10 via the second drive circuit 12. Thus, the plurality of switching elements 55 included in the second inverter circuit 52 are individually subjected to switching control by the control device 10. Each of the first drive circuit 11 and the second drive circuit 12 is a circuit that enhances (amplifies) the drive ability (the ability of operating downstream circuits, such as a voltage amplitude and output current) of a switching control signal generated by the control device 10 and relays the switching control signal to the inverter 50 (switching elements 55).

As described above, the coil 30 includes the first coil portion 31 and the second coil portion 32 electrically insulated from each other, and the inverter 50 includes the first inverter circuit 51 that supplies AC power to the first coil portion 31, and the second inverter circuit 52 that supplies AC power to the second coil portion 32. Therefore, the first inverter circuit 51 and the second inverter circuit 52 can together supply AC power to the rotary electric machine 20. Accordingly, it is possible to increase the capacity of the entire inverter, that is, increase the magnitude of AC power that can be supplied from the inverter 50 to the rotary electric machine 20, while minimizing the required capacity of each of the first inverter circuit 51 and the second inverter circuit 52. However, with this configuration, a difference in switching timing between the first inverter circuit 51 and the second inverter circuit 52 may cause a difference in current amplitude between the first coil portion 31 and the second coil portion 32 as described below.

Figure 4:
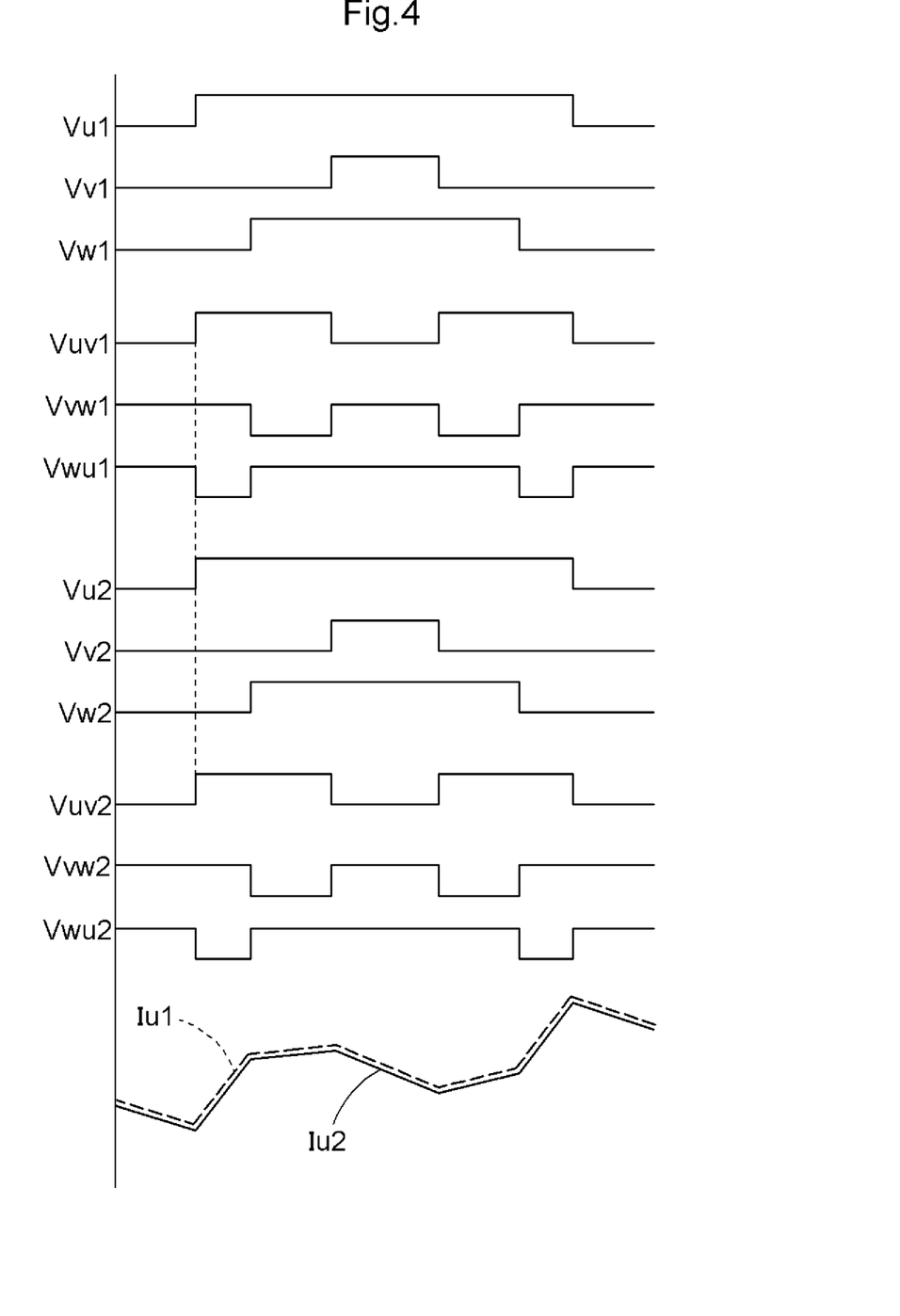
FIG. 4 illustrates an example of waveforms when there is no difference in switching timing between a first inverter circuit and a second inverter circuit.
Figure 5:
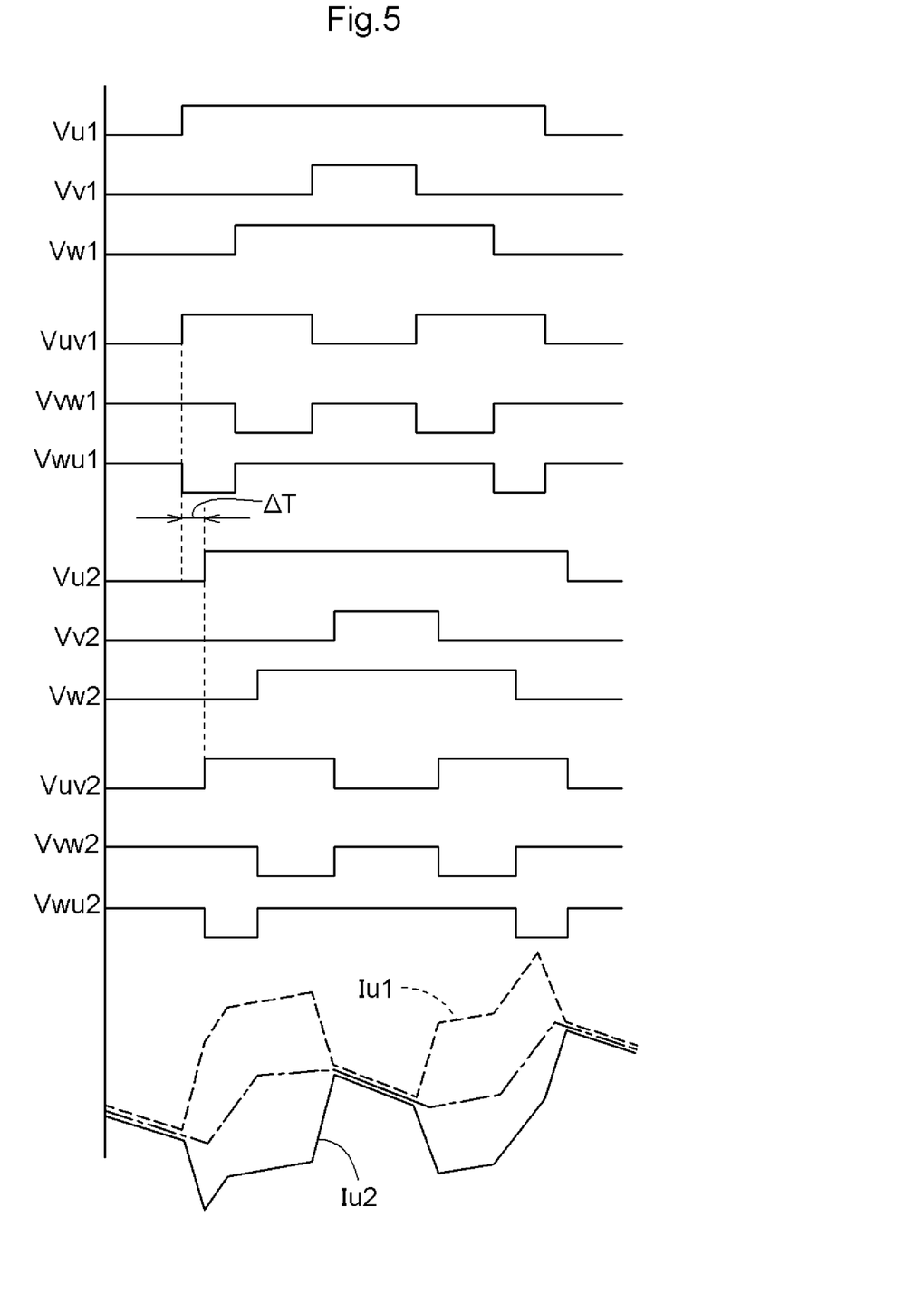
FIG. 5 illustrates an example of waveforms when there is a difference in switching timing between the first inverter circuit and the second inverter circuit.

The difference in current amplitude will be described with reference to FIGS. 4 and 5. Each of the graphs of FIGS. 4 and 5 illustrates an example of waveforms of gate drive signals of the respective phases (Vu1, Vv1, and Vw1) for the first coil portion 31, line voltages (Vuv1, Vvw1, and Vwu1) between phases (between U and V, between V and W, and between W and U) for the first coil portion 31, gate drive signals of the respective phases (Vu2, Vv2, and Vw2) for the second coil portion 32, line voltages (Vuv2, Vvw2, and Vwu2) between phases (between U and V, between V and W, and between W and U) for the second coil portion 32, a first U-phase current (Iu1) flowing through the first U-phase coil portion 31u, and a second U-phase current (Iu2) flowing through the second U-phase coil portion 32u, with time on the horizontal axis. When the gate drive signal is high level, the upper-stage (positive) switching element 55 of the two switching elements 55 included in an arm is turned on, and the lower-stage (negative) switching element 55 is turned off. When the gate drive signal is low level, the upper-stage switching element 55 of the two switching elements 55 included in an arm is turned off, and the lower-stage switching element 55 is turned on.

FIG. 4 illustrates an example of waveforms when there is no difference in switching timing between the first inverter circuit 51 and the second inverter circuit 52. FIG. 5 illustrates an example of waveforms when there is a difference in switching timing between the first inverter circuit 51 and the second inverter circuit 52, particularly when the switching timing of the second inverter circuit 52 is delayed by time ΔT with respect to the switching timing of the first inverter circuit 51. As illustrated in FIG. 4, when there is no difference in switching timing between the first inverter circuit 51 and the second inverter circuit 52, there is generally no difference in amplitude between the first U-phase current (Iu1) and the second U-phase current (Iu2). Whereas, as illustrated in FIG. 5, when there is a difference in switching timing between the first inverter circuit 51 and the second inverter circuit 52, there may be a difference in amplitude between the first U-phase current (Iu1) and the second U-phase current (Iu2). Note that, in FIG. 5, the waveform of the U-phase currents (Iu1 and Iu2) of FIG. 4 are indicated by the one-dot chain line for the purpose of comparison.

Specifically, referring to the point where the U-V voltages (Vuv1 and Vuv2) are changed from the low level to the high level (the point representing ΔT) in FIG. 5, the U-V voltage (Vuv1) of the first coil portion 31 is changed from the low level to the high level at a point earlier than the U-V voltage (Vuv2) of the second coil portion 32 is, due to the difference in switching timing between the first inverter circuit 51 and the second inverter circuit 52. Therefore, the first U-phase current (Iu1) starts to rise at this point, whereas the second U-phase current (Iu2) starts to rise at the point later than this point by ΔT. In the case where the magnetic circuit formed by the current flowing through the first coil portion 31 and the magnetic circuit formed by the current flowing through the second coil portion 32 are completely independent of each other, the second U-phase current (Iu2) is not affected by a change in the first U-phase current (Iu1). Accordingly, the waveform of the second U-phase current (Iu2) is simply delayed from the waveform of the first U-phase current (Iu1) by ΔT, so that the difference in amplitude between the first U-phase current (Iu1) and the second U-phase current (Iu2) is not greatly increased.

Whereas, in the case where the magnetic circuit formed by the current flowing through the first coil portion 31 and the magnetic circuit formed by the current flowing through the second coil portion 32 are not highly independent of each other, an electromotive voltage of the second U-phase coil portion 32u may change such that the second U-phase current (Iu2) decreases due to a change in magnetic flux in the stator core 22 caused by a rise in the first U-phase current (Iu1), during a period (period indicated by ΔT) from when the first U-phase current (Iu1) starts to rise to when the second U-phase current (Iu2) starts to rise. FIG. 5 illustrates the waveform of the U-phase currents (Iu1 and Iu2) when this phenomenon occurs. In the period indicated by ΔT, the second U-phase current (Iu2) decreases at a decrease rate greater than the preceding decrease rate. Thus, the value of the second phase current (Iu2) at the point when the second phase current (Iu2) starts to rise is greatly lower than the value of the first phase current (Iu1) at the point when the first phase current (Iu1) starts to rise, resulting in a relatively large difference in amplitude between the first U-phase current (Iu1) and the second U-phase current (Iu2). Although not illustrated, there may also be a relatively large difference in amplitude between the current flowing through the first V-phase coil portion 31v and the current flowing through the second V-phase coil portion 32v, and between the current flowing through the first W-phase coil portion 31w and the current flowing through the second W-phase coil portion 32w.

To appropriately drive the rotary electric machine 20, it is preferable that the difference in current amplitude between the first coil portion 31 and the second coil portion 32 is small. To prevent an increase in the difference in current amplitude between the first coil portion 31 and the second coil portion 32, the difference in switching timing (ΔT in FIG. 5) between the first inverter circuit 51 and the second inverter circuit 52 may be reduced, or the independence between the magnetic circuit formed by the current flowing through the first coil portion 31 and the magnetic circuit formed by the current flowing through the second coil portion 32 may be increased.

In the present embodiment, to reduce the difference in switching timing between the first inverter circuit 51 and the second inverter circuit 52, the control device 10 outputs a common switching control signal (gate drive signal in this example) to the first drive circuit 11 and the second drive circuit 12. With the control device 10 having the configuration described above, it is possible to match the switching control signal output from the control device 10 to the first drive circuit 11 and the switching control signal output from the control device 10 to the second drive circuit 12, in each phase. Thus, compared to the case where a control device that outputs a switching control signal to the first drive circuit 11 and a control device that outputs a switching control signal to the second drive circuit 12 are separately provided, the difference in switching timing between the first inverter circuit 51 and the second inverter circuit 52 can easily be reduced.

In the present embodiment, to increase the independence between the magnetic circuit formed by the current flowing through the first coil portion 31 and the magnetic circuit formed by the current flowing through the second coil portion 32, the first coil portion 31 and the second coil portion 32 are arranged to be shifted from each other in the circumferential direction C. When the first coil portion 31 and the second coil portion 32 are arranged to be shifted from each other in the circumferential direction C, it indicates that, in each phase, the combination of the slots 23 in which the first coil portion 31 (the in-slot portions 38 of the first coil portion 31) is disposed is different from the combination of the slots 23 in which the second coil portion 32 (the in-slot portions 38 of the second coil portion 32) is disposed. There may be the slots 23 in which both the first coil portion 31 and the second coil portion 32 are disposed. In the present embodiment, in each phase, the first coil portion 31 and the second coil portion 32 are not disposed in the same slot 23 such that the first coil portion 31 and the second coil portion 32 are arranged to be shifted from each other in the circumferential direction C.

Since the first coil portion 31 and the second coil portion 32 are arranged to be shifted from each other in the circumferential direction C, it is possible to increase the independence between the magnetic circuit formed in the stator core 22 by the current flowing through the first coil portion 31 and the magnetic circuit formed in the stator core 22 by the current flowing through the second coil portion 32, compared to the case where the first coil portion 31 and the second coil portion 32 are arranged at the same position in the circumferential direction C. Even in the case where the control device 10 outputs a common switching control signal to the first drive circuit 11 and the second drive circuit 12 as described above, there is a certain amount of difference in switching timing between the first inverter circuit 51 and the second inverter circuit 52 due to variations in properties of the switching elements 55, variations in length of the transmission paths, and so on. However, by increasing the independence between the magnetic circuit formed by the current flowing through the first coil portion 31 and the magnetic circuit formed by the current flowing through the second coil portion 32, the difference in current amplitude between the first coil portion 31 and the second coil portion 32 can be minimized.

In the present embodiment, to ensure a high level of independence between the magnetic circuit formed by the current flowing through the first coil portion 31 and the magnetic circuit formed by the current flowing through the second coil portion 32, the first coil portion 31 and the second coil portion 32 are arranged such that the arrangement areas thereof do not overlap each other in the circumferential direction C as illustrated in FIG. 6. When the arrangement areas of the first coil portion 31 and the second coil portion 32 do not overlap each other in the circumferential direction C, it indicates that the arrangement areas of the first coil portion 31 and the second coil portion 32 do not overlap each other in the circumferential direction C among the coils of the same phase. The arrangement areas of the first coil portion 31 and the second coil portion 32 may overlap each other in the circumferential direction among the coils of different phases. In the present embodiment, as illustrated in FIG. 6, the arrangement areas of the first coil portion 31 and the second coil portion 32 do not overlap each other in the circumferential direction C, not only among the coils of the same phase, but also among the coils of different phases. Note that in FIG. 6 and FIGS. 8 and 10 to be later referred to, the in-slot portions 38 (see FIG. 2) are not illustrated, and only the outline of the area where the plurality of in-slot portions 38 are disposed in each slot 23 is illustrated in a simplified manner. Further, to easily distinguish the slots 23 in which the first coil portion 31 is disposed and the slots 23 where the second coil portion 32 is disposed, the area where the in-slot portions 38 of the first coil portion 31 are disposed is hatched.

The first coil portion 31 and the second coil portion 32 are disposed as illustrated in FIG. 6. Therefore, in the present embodiment, the phase coil portion of the first coil portion 31 and the phase coil portion of the second coil portion 32 included in each in-phase coil set are spaced apart from each other by a distance equal to or greater than twice the slot pitch (the arrangement pitch of the slots 23 in the circumferential direction C). That is, each of the slots 23 in which a phase coil portion of the first coil portion 31 is disposed is spaced apart from each of the slots 23 in which a phase coil portion of the second coil portion 32 that is included in the in-phase coil set including the former phase coil portion (hereinafter referred to as a "corresponding phase coil portion of the second coil portion 32") is disposed, by a distance equal to or greater than twice the slot pitch. In other words, each of the in-slot portions 38 (see FIG. 2) included in a phase coil portion of the first coil portion 31 is spaced apart from each of the in-slot portions 38 of the corresponding phase coil portion of the second coil portion 32, by a distance equal to or greater than twice the slot pitch. Referring particularly to the in-phase coil set including the first U-phase coil portion 31$u$ and the second U-phase coil portion 32$u$, in the example of FIGS. 6 and 7, each of the slots 23 in which the first U-phase coil portion 31$u$ is disposed is spaced apart from each of the slots 23 in which the second U-phase coil portion 32$u$ is disposed, by a distance equal to or greater than five times the slot pitch (that is, such that other four or more slots 23 are interposed therebetween).

In the present embodiment, each of the first coil portion 31 and the second coil portion 32 is wound in a wave pattern on the stator core 22. Specifically, as illustrated in FIG. 7, each of the first coil portion 31 and the second coil portion 32 includes a wave-wound turn 40 having the jumper portions 39 arranged alternately on one side and the other side in the extending direction of the slots 23 (the axial direction L in this example) as viewed toward one side in the circumferential direction C. In the present embodiment, since the first coil portion 31 and the second coil portion 32 are star connections, each of the wave-wound turns 40 includes a power-line-side end 40$a$ on the power line side in the energizing direction, and a neutral-point-side end 40$b$ on the neutral point side in the energizing direction. Among the plurality of wave-wound turns 40 included in the first coil portion 31, the wave-wound turns 40 of the same phase are connected in series or parallel to each other. Among the plurality of wave-wound turns 40 included in the second coil portion 32, the wave-wound turns 40 of the same phase are connected in series or parallel to each other. In FIG. 7, only the wave-wound turns 40 included in the first U-phase coil portion 31$u$ and the wave-wound turns 40 included in the second U-phase coil portion 32$u$ are illustrated. However, the wave-wound turns 40 of the other phases are configured in the same manner except that the arrangement positions in the circumferential direction C are different.

In the following, the first U-phase coil portion 31$u$ and the second U-phase coil portion 32$u$ will be described in detail. Note that coil portions of the other phases are configured in the same manner except that the arrangement positions in the circumferential direction C are different. As illustrated in FIG. 7, the first U-phase coil portion 31$u$ includes two types of wave-wound turns 40. The "type" used here is determined based on the combination of slots 23 in which the in-slot portions 38 are disposed, and the arrangement positions of the in-slot portions 38 in each slot 23 are not taken into account. Each of the two types of wave-wound turns 40 are configured such that the in-slot portions 38 are arranged at intervals equal to six times the slot pitch (the arrangement pitch of the slots 23 in the circumferential direction C) (that is, at intervals equal to the pole pitch). The two types of wave-wound turns 40 are arranged to be shifted from each other by one slot pitch in the circumferential direction C. That is, the same number of (two in the present embodiment) groups of slots 23 of the same phase that are adjacent in the circumferential direction C (hereinafter referred to as "in-phase slot groups") as the number of slots 23 in each pole and each phase are arranged at the pole pitch in the stator core 22. However, in the example of FIG. 7, the positional relationship between two types of wave-wound turns 40 in the circumferential direction C (the positional relationship between the in-slot portions 38 in the circumferential direction C) in an in-phase slot group is the same among all the in-phase slot groups. Similarly, the second U-phase coil portion 32$u$ includes two types of wave-wound turns 40 that are arranged to be shifted from each other by one slot pitch in the circumferential direction C.

In the example of FIG. 7, the positional relationship between two types of wave-wound turns 40 in the circumferential direction C in an in-phase slot group is the same among all the in-phase slot groups. However, as in the case of the wave-wound turns 40 of the first U-phase coil portion 31u and the wave-wound turns 40 of the second U-phase coil portion 32u in the example of FIG. 9 described below, the positional relationship between two types of wave-wound turns 40 in the circumferential direction C in an in-phase slot group may be opposite between the odd-numbered in-phase slot groups and the even-numbered in-phase slot groups as viewed toward one side in the circumferential direction C.

Second Embodiment

A drive device according to a second embodiment will be described with reference to FIGS. 8 and 9. A drive device 1 of the present embodiment is different from that of the first embodiment in that the arrangement areas of the first coil portion 31 and the second coil portion 32 overlap each other in the circumferential direction C. The following describes the drive device 1 of the present embodiment, focusing on the differences from the first embodiment. Elements not specifically described are the same as those of the first embodiment. The same elements are denoted by the same reference numerals, and will not be described in detail herein.

Figure 8:
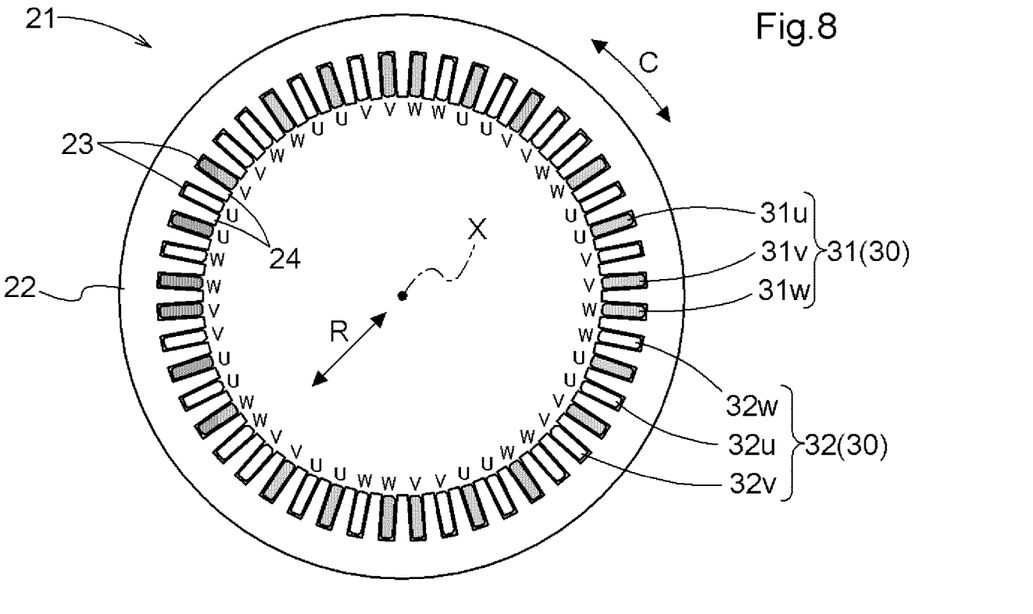
FIG. 8 illustrates the arrangement of a first coil portion and a second coil portion according to a second embodiment.

As illustrated in FIG. 8, in the present embodiment, similar to the first embodiment, the first coil portion 31 and the second coil portion 32 are arranged to be shifted from each other in the circumferential direction C. However, in the present embodiment, unlike the first embodiment, the first coil portion 31 and the second coil portion 32 are arranged such that the arrangement areas thereof overlap each other in the circumferential direction C. That is, in the first embodiment, the plurality of slots 23 in which the first coil portion 31 is disposed are arranged in the circumferential direction C without interposing the slots 23 in which the second coil portion 32 is disposed (see FIG. 6), whereas in the present embodiment, the plurality of slots 23 in which the first coil portion 31 is disposed are arranged in the circumferential direction C such that at least one slot 23 in which the second coil portion 32 is disposed is interposed therebetween in the circumferential direction C. Specifically, in the present embodiment, the amount of positional shift between the first coil portion 31 and the second coil portion 32 in the circumferential direction C may be an integer multiple of the slot pitch. This integer is a value equal to or less than (N−1) in which "N" represents the number of slots 23 in each pole and each phase. In this example, this integer is "1". Accordingly, as illustrated in FIG. 8, in each in-phase slot group (group of the slots 23 of the same phase that are adjacent in the circumferential direction C as described above), the first coil portion 31 and the second coil portion 32 are arranged separately in the two slots 23 adjacent in the circumferential direction C. Therefore, in the present embodiment, the phase coil portion of the first coil portion 31 and the phase coil portion of the second coil portion 32 included in an in-phase coil set are spaced apart from each other by a distance equal to or greater than once the slot pitch. That is, in the present embodiment, unlike the first embodiment, the phase coil portion of the first coil portion 31 and the phase coil portion of the second coil portion 32 included in an in-phase coil set are not spaced apart from each other by a distance equal to or greater than twice the slot pitch.

Figure 9:
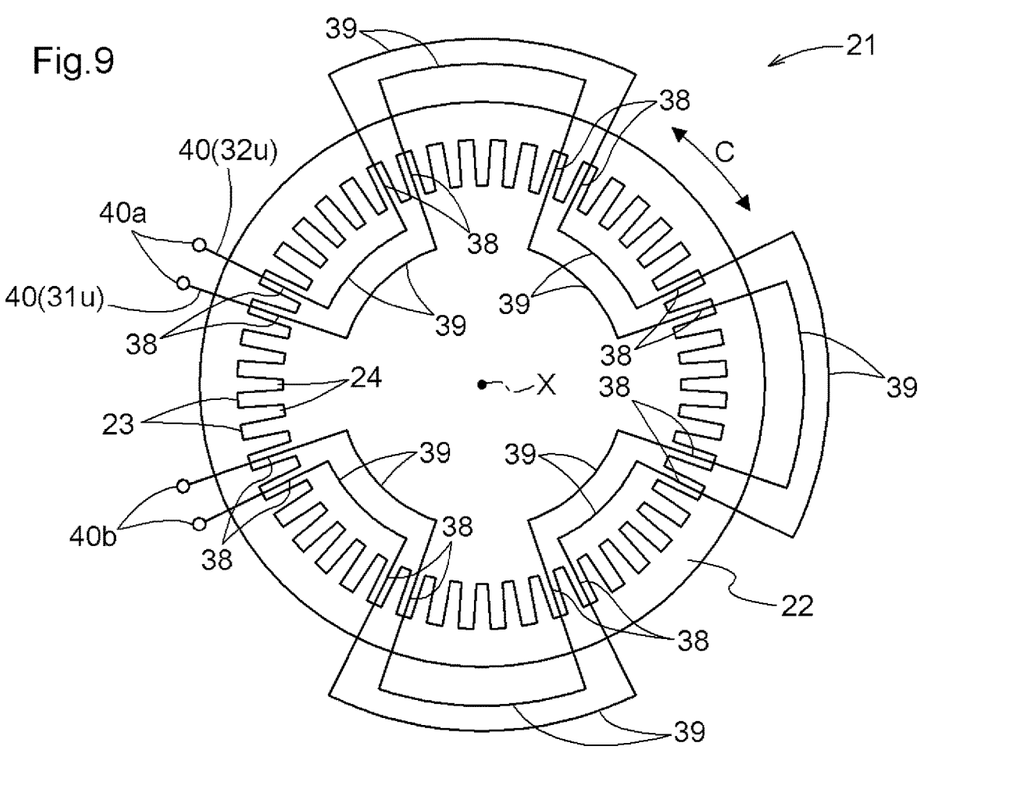
FIG. 9 illustrates wave-wound turns wound on a stator core according to the second embodiment.

Referring particularly to the first U-phase coil portion 31u and the second U-phase coil portion 32u, as illustrated in FIG. 9, in the present embodiment, each of the first U-phase coil portion 31u and the second U-phase coil portion 32u includes one type of wave-wound turn 40. The wave-wound turn 40 is different from the wave-wound turn 40 of the first embodiment, and is wound around the stator core 22 in the circumferential direction C. In the example of FIG. 9, the positional relationship between the wave-wound turn 40 of the first U-phase coil portion 31u and the wave-wound turn 40 of the second U-phase coil portion 32u in the circumferential direction C in an in-phase slot group is opposite between the odd-numbered in-phase slot groups and the even-numbered in-phase slot groups as viewed toward one side in the circumferential direction C.

In the example of FIG. 9, the positional relationship between the wave-wound turn 40 of the first U-phase coil portion 31u and the wave-wound turn 40 of the second U-phase coil portion 32u in the circumferential direction C in an in-phase slot group is opposite between the odd-numbered in-phase slot groups and the even-numbered in-phase slot groups as viewed toward one side in the circumferential direction C. However, as in the case of the two types of wave-wound turns 40 of each of the first U-phase coil portion 31u and the second U-phase coil portion 32u in the example of FIG. 7, the positional relationship between the wave-wound turn 40 of the first U-phase coil portion 31u and the wave-wound turn 40 of the second U-phase coil portion 32u in the circumferential direction C in an in-phase slot group may be the same among all the in-phase slot groups.

Third Embodiment

A drive device according to a third embodiment will be described with reference to FIGS. 10 and 11. A drive device 1 of the present embodiment is different from that of the first embodiment in that the first coil portion 31 and the second coil portion 32 are disposed in the same position in the circumferential direction C. The following describes the drive device 1 of the present embodiment, focusing on the differences from the first embodiment. Elements not specifically described are the same as those of the first embodiment. The same elements are denoted by the same reference numerals, and will not be described in detail herein.

Figure 10:
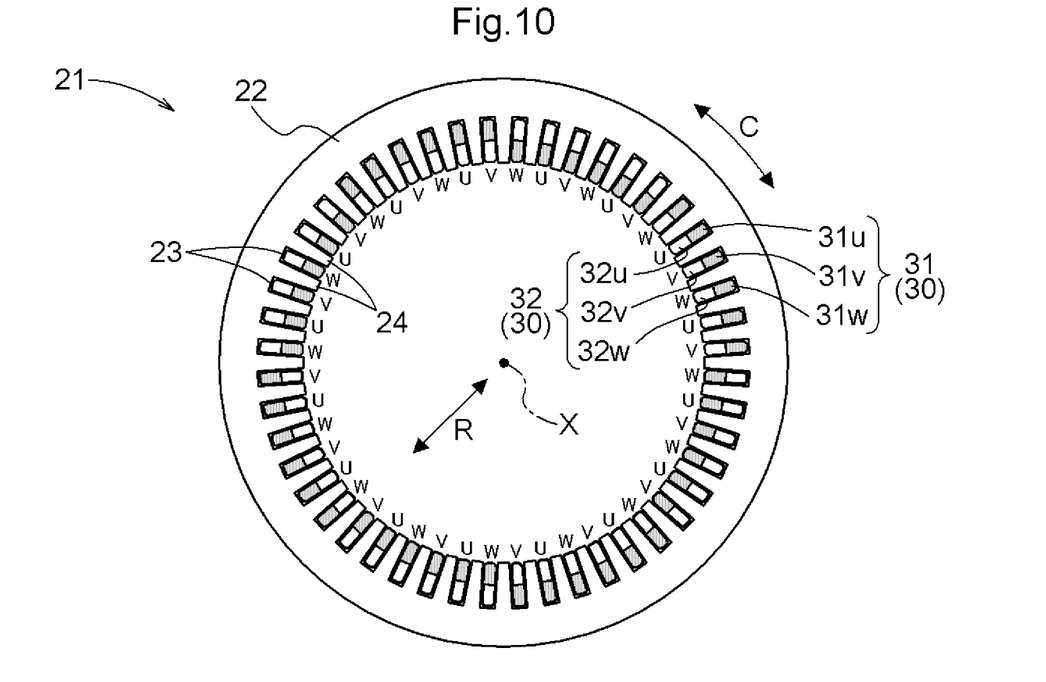
FIG. 10 illustrates the arrangement of a first coil portion and a second coil portion according to a third embodiment.

In the present embodiment, as illustrated in FIG. 10, the coil 30 is wound on the stator core 22 such that the number of slots 23 in each pole and each phase is singular. Further, in the present embodiment, the first coil portion 31 and the second coil portion 32 are arranged to be shifted from each other in the radial direction R. Thus, the independence between the magnetic circuit formed by the current flowing through the first coil portion 31 and the magnetic circuit formed by the current flowing through the second coil portion 32 is improved, while the first coil portion 31 and the second coil portion 32 are arranged at the same position in the circumferential direction C.

Specifically, in the example of FIG. 10, in each slot 23, the first coil portion 31 and the second coil portion 32 are separately arranged in an inner portion and an outer portion in the radial direction R. Further, when a plurality of (six in this example) of slots 23 adjacent in the circumferential direction C are defined as a set, the positional relationship of the first coil portion 31 and the second coil portion 32 in the radial direction R is opposite between different sets adjacent in the circumferential direction C. That is, in the example of FIG. 10, the first coil portion 31 and the second coil portion 32 are arranged such that the positional relationship between the first coil portion 31 and the second coil portion 32 in the radial direction R is inverted at a magnetic pole set pitch in the circumferential direction C. Thus, the average distance (the average distance at each position in the circumferential direction C) between the first coil portion 31 and the rotor 25 (see FIG. 1) in the radial direction R and the average distance between the second coil portion 32 and the rotor 25 in the radial direction R can be substantially equal.

Figure 11:
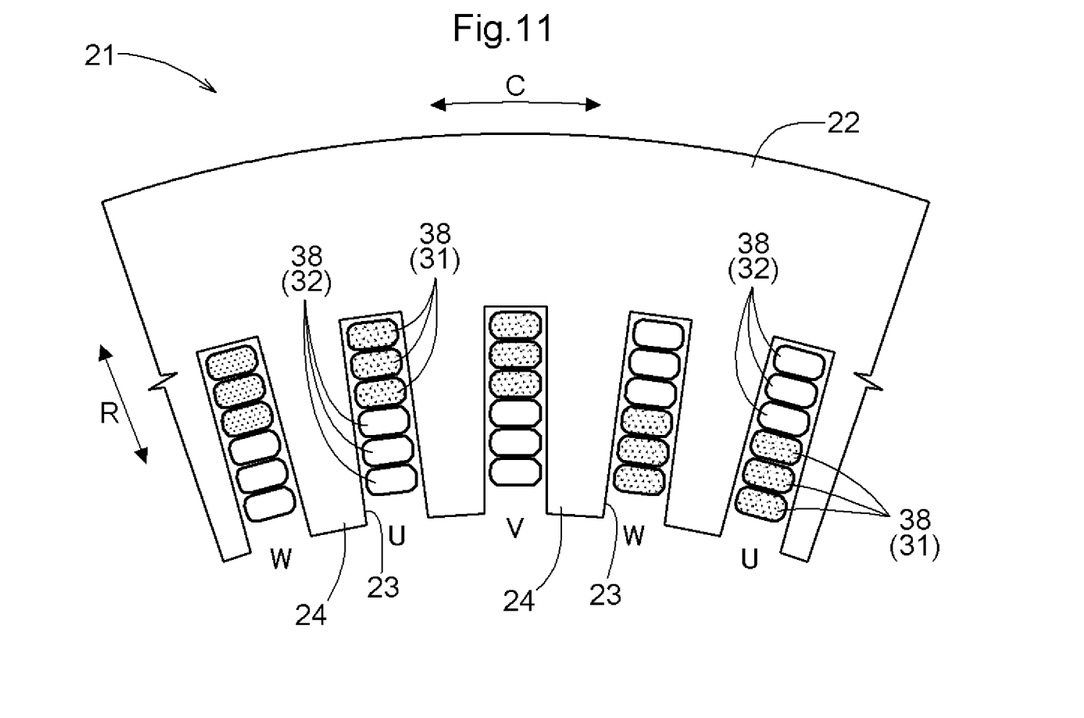
FIG. 11 is a cross-sectional view illustrating a part of a stator in a direction orthogonal to an axial direction according to the third embodiment.

In the present embodiment, as illustrated in FIG. 11, three in-slot portions 38 included in the first coil portion 31 and three in-slot portions 38 included in the second coil portion 32 are separately arranged in the inner portion and the outer portion in the radial direction R (that is, on the inner side and the outer side of the boundary in the radial direction R) in each slot 23. In the case where a plurality of in-slot portions 38 included in the first coil portion 31 and a plurality of in-slot portions 38 included in the second coil portion 32 are arranged in each slot 23 as described above, the in-slot portion 38 closest to the first neutral point 61 in arrangement order in the energization direction among the plurality of in-slot portions 38 included in the first coil portion 31 and the in-slot portion 38 closest to the second neutral point 62 in arrangement order in the energization direction among the plurality of in-slot portions 38 included in the second coil portion 32 are preferably arranged adjacent to each other in the radial direction R. For example, the arrangement order of the plurality of in-slot portions 38 included in the first coil portion 31 from the side closer to the boundary in the radial direction R may coincide with the arrangement order from the side closer to the first neutral point 61 in the energizing direction, and arrangement order of the plurality of in-slot portions 38 included in the second coil portion 32 from the side closer to the boundary in the radial direction R may coincide with the arrangement order from the side closer to the second neutral point 62 in the energizing direction.

When there is a difference in switching timing between the first inverter circuit 51 and the second inverter circuit 52, the potential difference between the in-slot portions 38 of the first coil portion 31 and the in-slot portions 38 of the second coil portion 32 disposed in the same slot 23 may be increased. However, since the in-slot portions 38 closest to the neutral point are arranged adjacent to each other in the radial direction R as described above, it is possible to minimize the potential difference between the in-slot portion 38 of the first coil portion 31 and the in-slot portion 38 of the second coil portion 32 that are adjacent in the radial direction R, and to improve the electrical insulating properties of the coil 30.

Other Embodiments

Hereinafter, drive devices according to other embodiments will be described.

(1) In the first embodiment, the first coil portion 31 and the second coil portion 32 are arranged such that arrangement areas thereof do not overlap each other in the circumferential direction C, and the phase coil portion of the first coil portion 31 and the phase coil portion of the second coil portion 32 included in each in-phase coil set are spaced apart from each other by a distance equal to or greater than twice the slot pitch. In the second embodiment, the first coil portion 31 and the second coil portion 32 are arranged such that arrangement areas thereof overlap each other in the circumferential direction C, and the phase coil portion of the first coil portion 31 and the phase coil portion of the second coil portion 32 included in each in-phase coil set are not spaced apart from each other by a distance equal to or greater than twice the slot pitch. However, the present disclosure is not limited to this configuration. The first coil portion 31 and the second coil portion 32 are arranged such that arrangement areas thereof overlap each other in the circumferential direction C, and the phase coil portion of the first coil portion 31 and the phase coil portion of the second coil portion 32 included in each in-phase coil set may be spaced apart from each other by a distance equal to or greater than twice the slot pitch.

In an example of the configuration described above, in the case where the number of slots 23 in each pole and each phase is "2" as in the example of FIG. 6, when twelve slots 23 arranged in the circumferential direction C are defined as a slot group, the first coil portion 31 and the second coil portion 32 may be alternately arranged in units of slot groups in the circumferential direction C. Note that the slot groups are set such that the slots 23 of the same phase adjacent in the circumferential direction C belong to the same slot group. In the example of FIG. 6, a total of forty-eight slots 23 are formed in the stator core 22. Therefore, in the case where the first coil portion 31 and the second coil portion 32 are arranged in the manner described above, there are two slot groups (first slot groups) in which the first coil portion 31 is disposed and two slot groups (second slot groups) in which the second coil portion 32 is disposed, and the first slot groups and the second slot groups are alternately arranged in the circumferential direction C.

In another example, in the case where the number of slots 23 in each pole and each phase is "1" as in the example of FIG. 10, when six slots 23 arranged in the circumferential direction C are defined as a slot group, the first coil portion 31 and the second coil portion 32 may be alternately arranged in units of slot groups in the circumferential direction C. In the example of FIG. 10, a total of forty-eight slots 23 are formed in the stator core 22. Therefore, in the case where the first coil portion 31 and the second coil portion 32 are arranged in the manner described above, there are four slot groups (first slot groups) in which the first coil portion 31 is disposed and four slot groups (second slot groups) in which the second coil portion 32 is disposed, and the first slot groups and the second slot groups are alternately arranged in the circumferential direction C.

(2) In the embodiments described above, the coil 30 includes the first coil portion 31 and the second coil portion 32 electrically insulated from each other. However, the present disclosure is not limited to this configuration. The coil 30 may include three or more coil portions (the first coil portion 31, the second coil portion 32, and one or more other coil portions) electrically insulated from each other. In this case, the inverter 50 may include inverter circuits for the respective three or more coil portions, and individually supply AC power to the respective three or more coil portions.

(3) In the above embodiments, the common control device 10 outputs a switching control signal to each of the first drive circuit 11 and the second drive circuit 12. However, the present disclosure is not limited to this configuration. A control device that outputs a switching control signal to the first drive circuit 11, and a control device that outputs a switching control signal to the second drive circuit 12 may be separately provided.

(4) In the embodiments described above, each of the first coil portion 31 and the second coil portion 32 includes the wave-wound turn 40. However, the present disclosure is not limited to this configuration. The first coil portion 31 and the second coil portion 32 may include a coaxial winding (lap winding) formed by winding a linear conductor around a pair of slots 23 or a plurality of pairs of slots 23 a plurality of turns.

(5) In the embodiments described above, the plurality of phase coil portions included in the first coil portion 31 are star-connected, and the plurality of phase coil portions included in the second coil portion 32 are star-connected. However, the present disclosure is not limited to this configuration. The plurality of phase coil portions included in the first coil portion 31 may be delta-connected, and the plurality of phase coil portions included in the second coil portion 32 may be delta-connected.

(6) In the embodiments described above, the rotary electric machine 20 is an inner-rotor rotary electric machine. However, the present disclosure is not limited to this configuration. The rotary electric machine 20 may be an outer-rotor rotary electric machine. Further, the rotary electric machine 20 does not have to be a radial gap type rotary electric machine, and may be an axial gap type rotary electric machine. In this case, the jumper portions 39 each connecting two in-slot portions 38 on the outer side of the slots 23 are disposed on one side or the other side in the radial direction R (the extending direction of the slots 23) with respect to the stator core 22.

(7) In the first and second embodiments described above, the coil 30 is wound on the stator core 22 such that the number of slots 23 in each pole and each phase is "2". However, the present disclosure is not limited to this configuration. In the configurations of the first and second embodiments, the coil 30 may be wound on the stator core 22 such that the number of slots 23 in each pole and each phase is "3" or greater. Further, in the configuration of the first embodiment, the coil 30 may be wound on the stator core 22 such that the number of slots 23 in each pole and each phase may be "1". In the third embodiment, the coil 30 is wound on the stator core 22 such that the number of slots 23 in each pole and each phase is "1". However, the present disclosure is not limited to this configuration. In the configuration of the third embodiment, the coil 30 may be wound on the stator core 22 such that the number of slots 23 in each pole and each phase may be plural.

(8) The features disclosed in any of the embodiments described above (and the embodiments described as other embodiments) may be applied in combination with the features disclosed in the other embodiments as long as no inconsistency arises. Regarding other features as well, the embodiments disclosed herein are merely examples in all respects. Accordingly, various modifications may be appropriately made without departing from the scope and spirit of the present disclosure.

Summary of Embodiments

The following provides a summary of the drive device described above.

A drive device (1) includes: a rotating-field rotary electric machine (20); and an inverter (50) that drives the rotary electric machine (20); wherein the rotary electric machine (20) includes a stator core (22), and a coil (30) wound on the stator core (22); the coil (30) includes a first coil portion (31) and a second coil portion (32) electrically insulated from each other; and the inverter (50) includes a first inverter circuit (51) that supplies AC power to the first coil portion (31), and a second inverter circuit (52) that supplies AC power to the second coil portion (32).

According to the above configuration, the rotary electric machine (20) can be driven by both the AC power supplied from the first inverter circuit (51) to the first coil portion (31) and the AC power supplied from the second inverter circuit (52) to the second coil portion (32). That is, the first inverter circuit (51) and the second inverter circuit (52) can together supply AC power to the rotary electric machine (20). Accordingly, it is possible to increase the capacity of the entire inverter, that is, increase the magnitude of AC power that can be supplied from the inverter (50) to the rotary electric machine (20), while minimizing the required capacity of each of the first inverter circuit (51) and the second inverter circuit (52).

The first coil portion (31) and the second coil portion (32) may be arranged to be shifted from each other in a circumferential direction (C).

According to this configuration, the independence between the magnetic circuit formed in the stator core (22) by the current flowing through the first coil portion (31) and the magnetic circuit formed in the stator core (22) by the current flowing through the second coil portion (32) can be increased, compared to the case where the first coil portion (31) and the second coil portion (32) are arranged at the same position in the circumferential direction (C). Accordingly, even when there is a difference in switching timing between the first inverter circuit (51) and the second inverter circuit (52), it is possible to minimize the influence of the magnetic flux generated by the current flowing through one of the first coil portion (31) and the second coil portion (32) on the other one of the first coil portion (31) and the second coil portion (32). Accordingly, even when there is a difference in switching timing between the first inverter circuit (51) and the second inverter circuit (52), it is possible to minimize the difference in current amplitude between the first coil portion (31) and the second coil portion (32), and to appropriately drive the rotary electric machine (20).

In the case where the first coil portion (31) and the second coil portion (32) are arranged to be shifted from each other in the circumferential direction (C) as described above, the stator core (22) may include a plurality of slots (23) arranged in a distributed manner in the circumferential direction (C); each of the first coil portion (31) and the second coil portion (32) may include a plurality of phase coil portions (31u, 31v, 31w, 32u, 32v, 32w) through which alternating currents of different phases flow; and when a set of the phase coil portion of the first coil portion (31) and the phase coil portion of the second coil portion (32) that are controlled such that currents of a same phase flow the set of the phase coil portions is defined as an in-phase coil set, the phase coil portion of the first coil portion (31) and the phase coil portion of the second coil portion (32) included in the in-phase coil set may be spaced apart from each other by a distance equal to or greater than twice an arrangement pitch of the slots (23) in the circumferential direction (C).

According to this configuration, the first coil portion (31) and the second coil portion (32) included in the in-phase coil set are spaced apart from each other in the circumferential direction (C). Thus, the independence between the magnetic circuit formed in the stator core (22) by the current flowing through the first coil portion (31) and the magnetic circuit formed in the stator core (22) by the current flowing through the second coil portion (32) can be increased.

The first coil portion (31) and the second coil portion (32) may be arranged such that arrangement areas of the first coil portion (31) and the second coil portion (32) do not overlap each other in the circumferential direction (C).

According to this configuration, the independence between the magnetic circuit formed in the stator core (22) by the current flowing through the first coil portion (31) and the magnetic circuit formed in the stator core (22) by the current flowing through the second coil portion (32) can easily be increased.

The stator core (22) may include a plurality of slots (23) arranged in a distributed manner in the circumferential direction (C); the coil (30) may be wound on the stator core (22) such that a number of slots (23) in each pole and each phase is plural; and an amount of positional shift between the first coil portion (31) and the second coil portion (32) in the circumferential direction (C) may be an integer multiple of an arrangement pitch of the slots (23) in the circumferential direction (C).

According to this configuration, in the case where the coil (30) is wound on the stator core (22) such that the number of slots (23) in each pole and each phase is plural, the first coil portion (31) and the second coil portion (32) can be arranged to be shifted from each other in the circumferential direction (C), while the arrangement areas of first coil portion (31) and the second coil portion (32) overlap each other in the circumferential direction (C).

In the drive device having any of the above configurations may further include a control device (10) that generates a switching control signal for controlling switching of the inverter (50); a first drive circuit (11) that drives the first inverter circuit (51), based on the switching control signal input from the control device (10); and a second drive circuit (12) that drives the second inverter circuit (52), based on the switching control signal input from the control device (10); wherein the control device (10) may be configured to output the switching control signal to the first drive circuit (11) and the second drive circuit (12), the switching control signal being common to the first drive circuit (11) and the second drive circuit (12).

According to this configuration, the difference in switching timing between the first inverter circuit (51) and the second inverter circuit (52) can easily be reduced, compared to the case where a control device that outputs a switching control signal to the first drive circuit (11) and a control device that outputs a switching control signal to the second drive circuit (12) are separately provided. When there is a difference in switching timing between the first inverter circuit (51) and the second inverter circuit (52), the magnetic flux generated by the current flowing through one of the first coil portion (31) and the second coil portion (32) affects the other one of the first coil portion (31) and the second coil portion (32), which may cause a difference in current amplitude between the first coil portion (31) and the second coil portion (32). According to the above configuration, it is possible to reduce the difference in switching timing between the first inverter circuit (51) and the second inverter circuit (52) which may cause such a difference in current amplitude, and to appropriately drive the rotary electric machine (20).

The drive device according to the present disclosure only needs to provide at least one of the above advantageous effects.

The invention claimed is:

1. A drive device comprising:
a rotating-field rotary electric machine; and
an inverter that drives the rotary electric machine, wherein:
  the rotary electric machine includes a stator core, and a coil wound on the stator core;
  the coil includes a first coil and a second coil electrically insulated from each other;
  the inverter includes a first inverter circuit that supplies AC power to the first coil, and a second inverter circuit that supplies AC power to the second coil;
  the first coil and the second coil are arranged to be shifted from each other in a circumferential direction;
  the stator core includes a plurality of slots arranged in a distributed manner in the circumferential direction;
  each of the first coil and the second coil includes a plurality of phase coil portions through which alternating currents of different phases flow; and
  when a set of a phase coil portion of the plurality of phase coil portions of the first coil and a phase coil portion of the plurality of phase coil portions of the second coil are controlled such that currents of a same phase that flow through the set is defined as an in-phase coil set, the phase coil portion of the plurality of phase coil portions of the first coil portion and the phase coil portion of the plurality of phase coil portions of the second coil portion of the in-phase coil set are spaced apart from each other by a distance equal to or greater than twice an arrangement pitch of the slots in the circumferential direction.

2. A drive device comprising:
a rotating-field rotary electric machine; and
an inverter that drives the rotary electric machine, wherein:
  the rotary electric machine includes a stator core, and a coil wound on the stator core;
  the coil includes a first coil and a second coil electrically insulated from each other;
  the inverter includes a first inverter circuit that supplies AC power to the first coil, and a second inverter circuit that supplies AC power to the second coil;
  the first coil and the second coil are arranged to be shifted from each other in a circumferential direction; and
  the first coil and the second coil are arranged such that arrangement areas of the first coil and the second coil on the stator core do not overlap each other in the circumferential direction.

3. A drive device comprising:
a rotating-field rotary electric machine; and
an inverter that drives the rotary electric machine, wherein:
  the rotary electric machine includes a stator core, and a coil wound on the stator core;
  the coil includes a first coil and a second coil electrically insulated from each other;
  the inverter includes a first inverter circuit that supplies AC power to the first coil, and a second inverter circuit that supplies AC power to the second coil;
  the first coil and the second coil are arranged to be shifted from each other in a circumferential direction;
  the stator core includes a plurality of slots arranged in a distributed manner in the circumferential direction;
  the coil is wound on the stator core such that a number of slots in each pole and each phase is plural; and
  an amount of positional shift between the first coil and the second coil in the circumferential direction is an integer multiple of an arrangement pitch of the slots in the circumferential direction.

4. The drive device according to claim 2, further comprising:
- a control device that generates a switching control signal for controlling switching of the inverter;
- a first drive circuit that drives the first inverter circuit, based on the switching control signal input from the control device; and
- a second drive circuit that drives the second inverter circuit, based on the switching control signal input from the control device; wherein
- the control device is configured to output the switching control signal to the first drive circuit and the second drive circuit, the switching control signal being common to the first drive circuit and the second drive circuit.

* * * * *